US007072070B2

(12) United States Patent
Masaki

(10) Patent No.: US 7,072,070 B2
(45) Date of Patent: Jul. 4, 2006

(54) PRINT CONTROLLING APPARATUS, PRINT CONTROLLING METHOD, COMPUTER PROGRAM AND RECORDING MEDIUM

(75) Inventor: Kazunori Masaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 09/885,055

(22) Filed: Jun. 21, 2001

(65) Prior Publication Data

US 2002/0051206 A1 May 2, 2002

(30) Foreign Application Priority Data

Jun. 23, 2000 (JP) ............................. 2000-189351
Mar. 28, 2001 (JP) ............................. 2001-092676

(51) Int. Cl.
*G06F 15/00* (2006.01)
(52) U.S. Cl. ..................... 358/1.18; 358/1.9; 358/1.12; 358/450; 493/405; 493/413; 493/430; 493/433; 715/525
(58) Field of Classification Search ............... 358/1.18, 358/1.12; 493/413; 715/525
See application file for complete search history.

(56) References Cited

U.S. PATENT DOCUMENTS

| 5,126,858 | A | * | 6/1992 | Kurogane et al. | .......... 358/450 |
| 5,207,412 | A | * | 5/1993 | Coons et al. | .............. 270/1.02 |
| 5,845,942 | A | * | 12/1998 | Hansen et al. | ................ 283/67 |
| 5,905,935 | A | * | 5/1999 | Wakamatsu et al. | ........ 399/407 |
| 6,045,158 | A | * | 4/2000 | Bergstresser | ................... 281/5 |
| 6,452,694 | B1 | * | 9/2002 | Eisenberg et al. | ......... 358/1.18 |
| 6,873,426 | B1 | * | 3/2005 | Farrell | ....................... 358/1.15 |
| 2001/0039554 | A1 | * | 11/2001 | Iwasaki | ..................... 707/525 |
| 2002/0051205 | A1 | * | 5/2002 | Teranishi et al. | .......... 358/1.18 |

* cited by examiner

*Primary Examiner*—Joseph R. Pokrzyna
*Assistant Examiner*—Mark R. Milia
(74) *Attorney, Agent, or Firm*—Fitzpatrick, Cella, Harper & Scinto

(57) ABSTRACT

In document output including mixture of different sizes, regarding a paper (A4 size) which is not Z-folded, header/footor information is printed on the paper as a designated manner, and, regarding a paper (A3 size) which is to be Z-folded, the header/footer information is combined with document data in such a manner that the position of the header/footer information after Z-folding apparently becomes the same as the position of the information on the A4 size. For example, in an opened condition, two header/footer information are printed at two positions, and positions of two header/footer informations are adjusted so that an information component (99/1) printed on an area A and an information component (2/31) printed on an area D constitute one header information as "99/12/31". As a result, the header/footer information can be recognized at a glance without opening the folded page, apparently similar to the non-Z-fold paper.

21 Claims, 12 Drawing Sheets

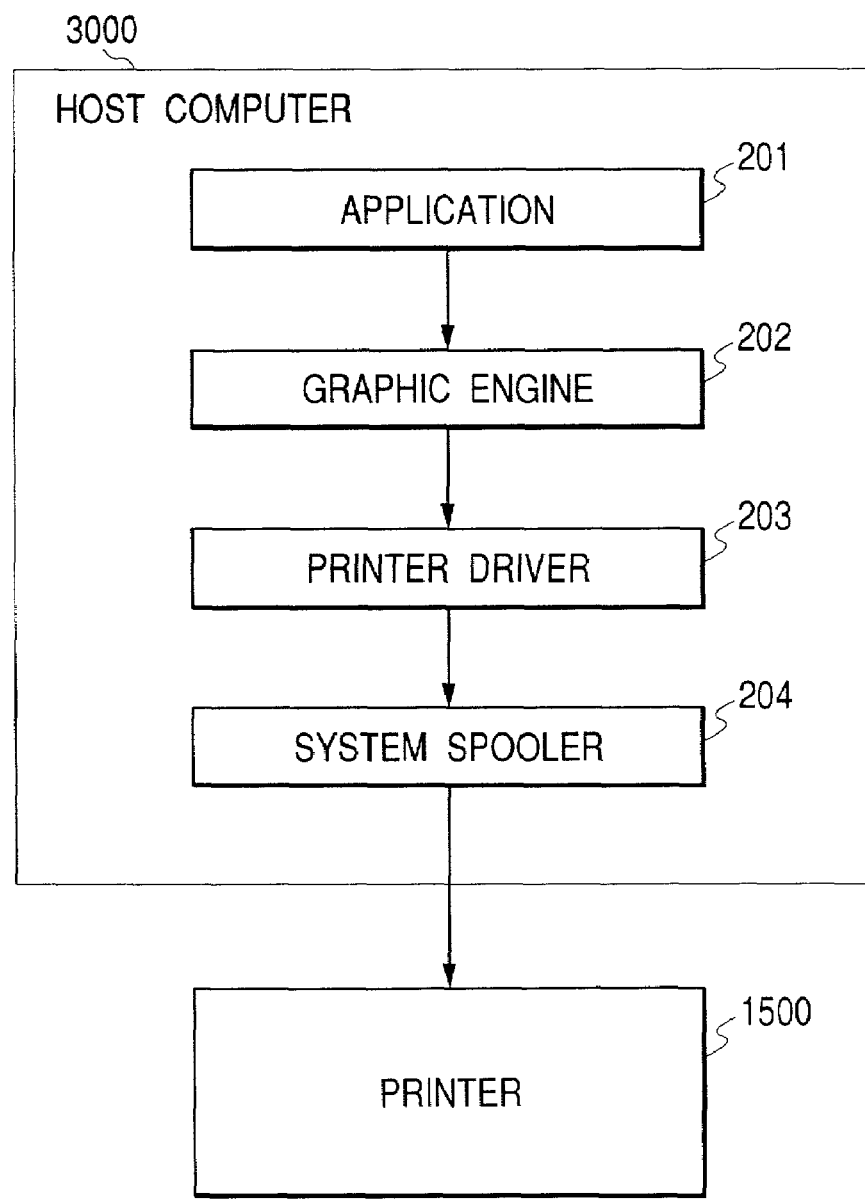

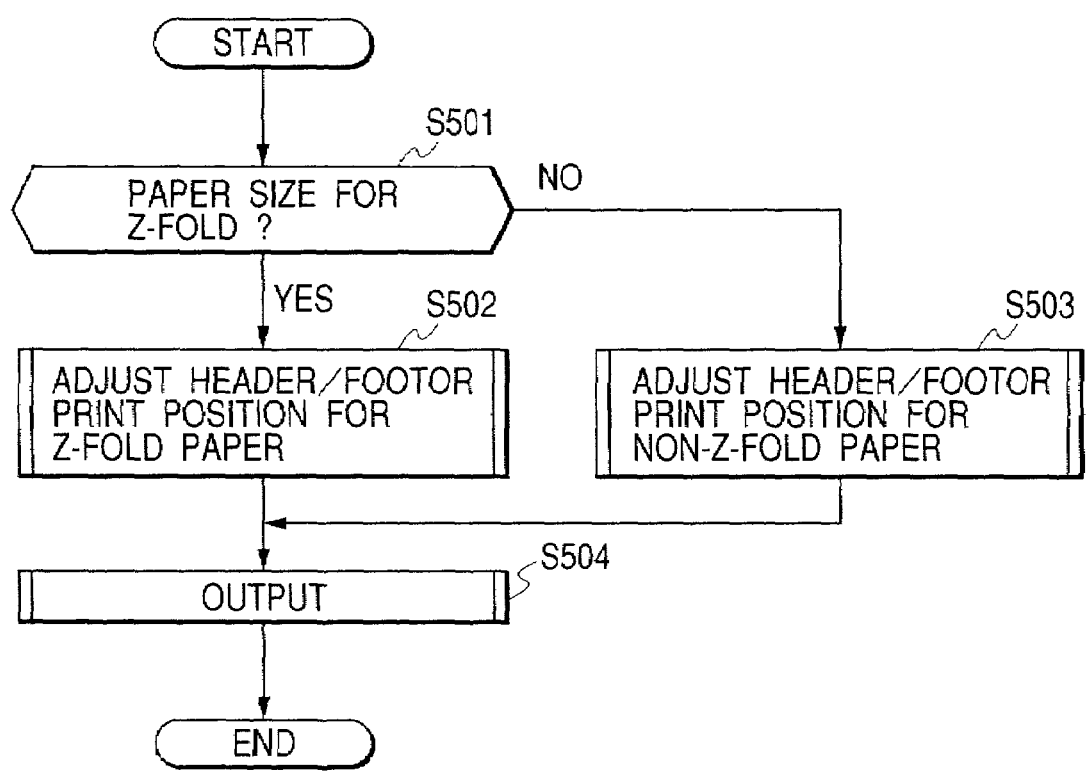

PRINT CONTROLLING APPARATUS, PRINT CONTROLLING METHOD, COMPUTER PROGRAM AND RECORDING MEDIUM

BACKGROUND OF THE INVENTION

1. Field of the Invention

The present invention relates to a print controlling apparatus for controlling a printing device having a folding page function such as Z-fold in such a manner that, when print information is printed by the printing device, additional information such as header/footer is also additionally printed, a print controlling method carried by such an apparatus, and a printing system, a recording medium and a program which are associated with such an apparatus.

2. Description of the Related Art

There has been proposed a print controlling apparatus for controlling a printing device having a folding page function such as Z-fold in such a manner that, when print information is printed by the printing device, additional information such as header/footer is also additionally printed. This apparatus is constituted, for example, as an information processing apparatus such as a personal computer, and a printing system is constituted by connecting the information processing apparatus to the printing device. In such a print controlling apparatus, when the print information is produced, additional information is added to each physical page, so that the print information is printer on a paper together with the additional information by the printing device. In this case, papers to which folding page is set are not distinguished from other papers, and the additional informations are printed at positions designated by the operator via the print controlling apparatus.

However, when document data including mixture of folding pages and non-folding pages is printed as the print information, although the additional informations printed on the non-folding pages can be recognized at a glance after printing, regarding the additional informations printed on the folding pages, if the additional information is printed on an area of the paper which is concealed after folding, the additional information is concealed partially or totally, so that the printed additional information cannot be recognized as it is. Thus, in order to recognize the additional information, the user must open the folded page, which leads in a troublesome working.

SUMMARY OF THE INVENTION

The present invention is made in consideration of the above-mentioned conventional circumstances, and an object of the present invention is to provide a print controlling apparatus for which predetermined additional information can be recognized at a glance without opening a folded page, a print controlling method carried out by such an apparatus, and a printing system, a recording medium and a program which are associated with such an apparatus.

To achieve the above object, the present invention provides a print controlling apparatus for controlling a printing device in such a manner that, after predetermined additional information added to print information is printed together with the print information on a paper, when the paper is folded into a predetermined form by a fold page function, regarding a printable area of the paper, a visible area which is not concealed before and after the paper is folded into the predetermined form and a non-visible area which is concealed after the paper is folded into the predetermined form are produced, comprising print control means for controlling the printing device so that the predetermined additional information is printed in at least the visible area to permit recognition of the predetermined additional information in a condition that the paper is folded.

DESCRIPTION OF THE DRAWINGS

FIG. 2 is a view showing main function blocks of the printing system;

FIG. 6 is a flow chart showing adjustment processing for the header/footer information print position in a first embodiment of the present invention;

DETAILED DESCRIPTION OF THE PREFERRED EMBODIMENTS

The present invention will now be explained in connection with embodiments thereof with reference to is the accompanying drawings.

First Embodiment

[Construction of Printing System]

Figure 1:
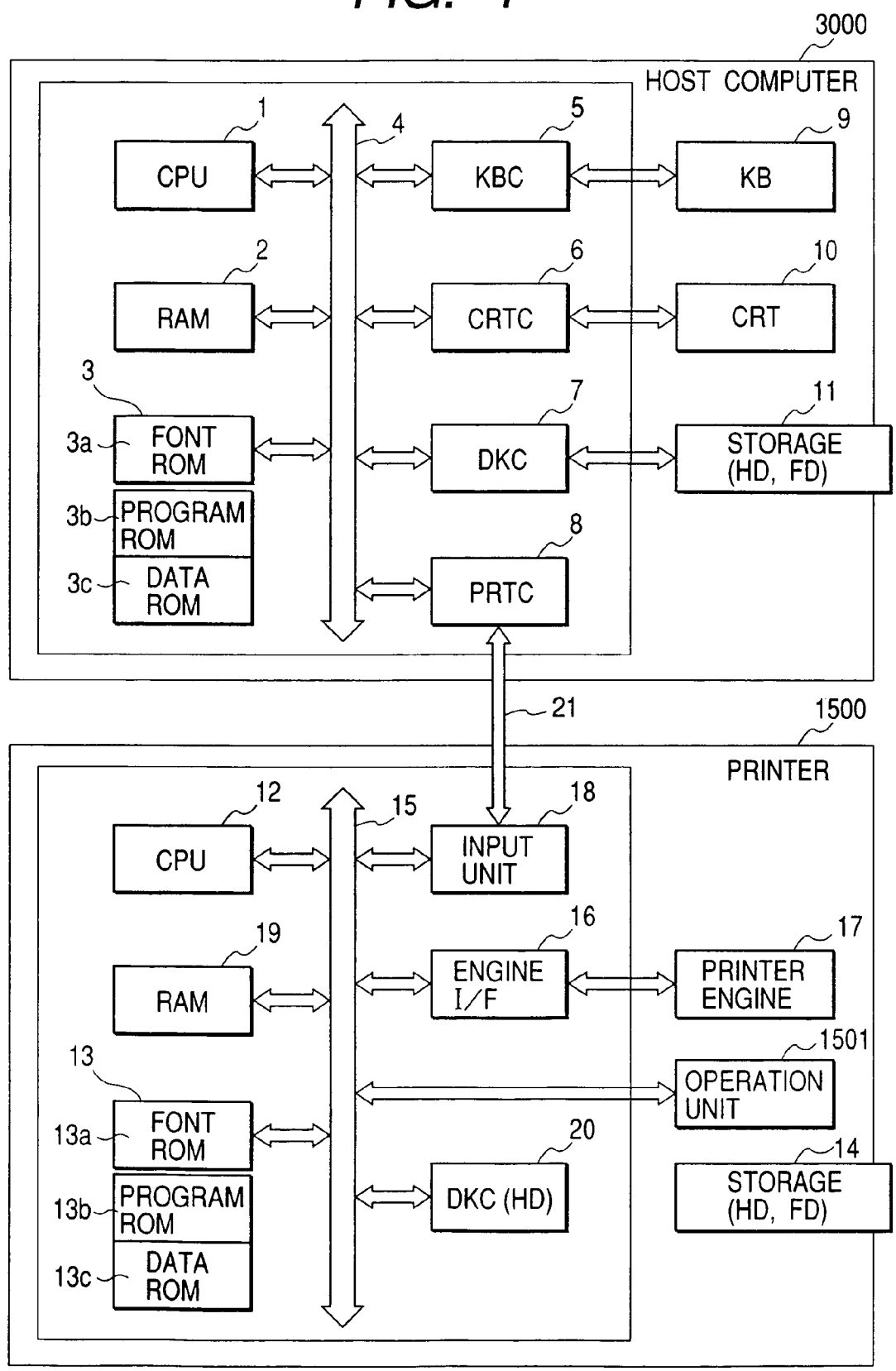
FIG. 1 is a block diagram showing an entire construction of a printing system according to a first embodiment of the present invention.

FIG. 1 is a block diagram showing an entire construction of a printing system according to a first embodiment of the present invention. This system is constituted by connecting a printer (printing device) 1500 to a host computer (print controlling apparatus; information processing apparatus) 3000.

Incidentally, in the following description, while a printing system using a laser beam printer is explained as an example, the present invention is not limited to such an example. Further, so long as the function of the present invention can be realized, the printing system may be constituted by a single equipment or plural equipments, or may be a system connected via a network such as LAN or WAN to effect processing.

In FIG. 1, the host computer 3000 includes ROM 3 comprised of font ROM 3a, program ROM 3b and font data ROM 3c. The host computer 3000 also includes CPU (print controlling apparatus; reverse side print controlling apparatus) 1 for executing document processing including mixture of figures, images, characters and graphs (including graph calculations) on the basis of a document processing program stored in the program ROM 3b of the ROM 3 or an external memory (HD; FD) 11 such as a hard disk or a floppy disk, and the CPU 1 collectively controls various devices connected to a system bus 4.

Further, an operating system (referred to as "OS" hereinafter) program as a control program for the CPU 1 is also stored in the program ROM 3b of the ROM 3 or the external memory 11, font data used for the document processing is stored in the font ROM 3a of the ROM 3 or the external memory 11, and various data used for the document processing (for example various page scribing language program or font lusterizing data) are stored in the font data ROM 3c of the ROM 3 or the external memory 11.

RAM 2 can be expanded by an option RAM and acts as a main memory and a work area of the CPU 1. A keyboard controller (KBC) 5 serves to control key input from a keyboard (KB) 9 or a pointing device (not shown).

A CRT controller (CRTC) 6 serves to effect display control of a CRT display (CRT) 10. A disk controller (DKC) 7 serves to control access to the external memory 11 storing boot program, various applications, font data, user file, editing file printing control command producing program (referred to as "printer driver" hereinafter). A printer controller (PRTC) 8 is connected to the printer 1500 via a predetermined bidirectional interface 21 and serves to effect communication control with the printer 1500.

Incidentally, for example, the CPU 1 performs development (lusterizing) processing of outline font to a display information RAM area set on the RAM 2 to permit WYSAWYG. Further, the CPU 1 opens various registered windows on the basis of command on the CRT 10 designated via a mouse cursor (not shown) to carry out various data processing.

When the print is performed, the operator or user opens the window regarding the setting of the print to permit the setting of the printer and the setting of the print processing method including selection of a print mode.

The printer 1500 is controlled by a printer CPU 12. The printer CPU 12 has a ROM 13 comprised of a font ROM 13a, a program ROM 13b and a data ROM 13c and serves to totally control access to various devices connected to a system bus 15 on the basis of a control program stored in the program ROM 13b or a control program stored in an external memory (HD, FD) 14 such as a hard disk, a floppy disk or an IC card and to output an image signal as output information to a printer portion (printer engine) 17 connected via a printer engine interface (I/F) 16.

Incidentally, the control program which can be executed by the printer CPU 12 is stored in the program ROM 13b, and font data (including outline font data) used for producing the output information is stored in the font ROM 13a, and, when the printer 1500 is a printer not having an external memory such as a hard disk or the like, information utilized on the host computer 3000 is stored in the data ROM 13c.

An operation unit 1501 comprises an operation panel including operating switches and an LED display (both are not shown). The printer CPU 12 can perform communication processing with the host computer 3000 via an input unit 18 to inform the host computer 3000 of the information within the printer 1500.

A RAM 19 acts as a main memory or a work area mainly for the printer CPU 12 and is designed so that memory capacity thereof can be expanded by an option RAM connected to an extension port. Incidentally, the RAM 19 is used as an output information development area, an environment data storing area, NVRAM and the like. The access to the external memory 14 is controlled by a disk controller (DKC) 20. The external memory 14 is optionally connected to store font data, emulation program and form data.

Further, the above-mentioned external memory is not limited to one, and, at least one external memory may be provided, or a plurality of external memories may be provided to store option font card and a program for interpreting printer control languages having different language systems, as well as internal font. Further, NVRAM (not shown) may be provided so that printer mode setting information from the operation unit 1501 can be stored for each user and for each group.

FIG. 2 is a view showing a main function block of the printing system.

Application 201, a graphic engine 202, a printer driver 203 and a system spooler 204 within the host computer 3000 exist as files stored in the external memory 11 and are program modules loaded to the RAM 2 and executed by a module utilizing OS or its module.

The application 201 and the printer driver 203 can be added to FD of the external memory 11 or to HD of the external memory 11 through CD-ROM (not shown) or a network (not shown). Although the application 201 stored in the external memory 11 is loaded to the RAM 2 and executed, when the application 201 causes the printer 1500 to effect the printing, output (formation of image) is effected by utilizing the graphic engine 202 similarly loaded to the RAM 2 and executed. The graphic engine 202 serves to load the printer driver 203 prepared for each printing device from the external memory 11 to the RAM 2 and to convert it into printer control command by using the printer driver 203. The converted printer control command is outputted to the printer 1500 through the system spooler 204 loaded to the RAM 2 by the OS via the interface.

[Z-fold Function]

Figure 3A:
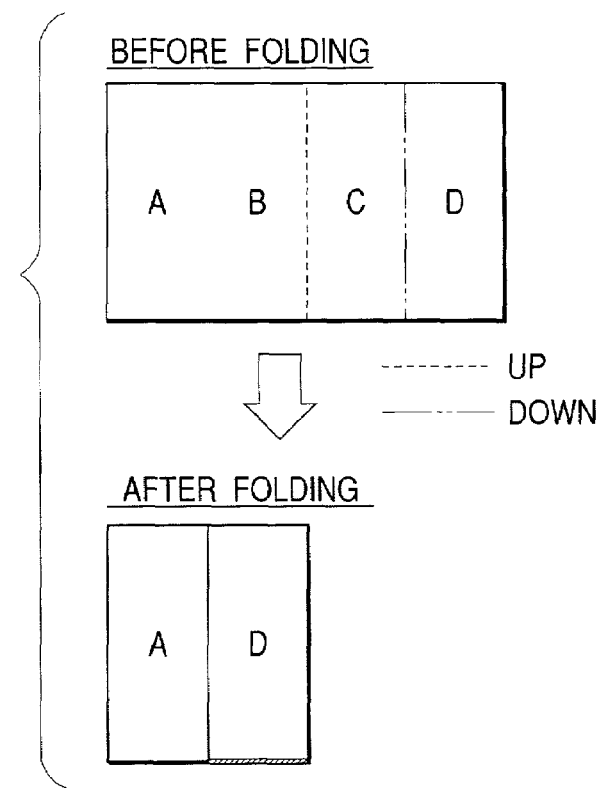
FIGS. 3A and 3B are views showing examples of Z-fold.
Figure 3B:
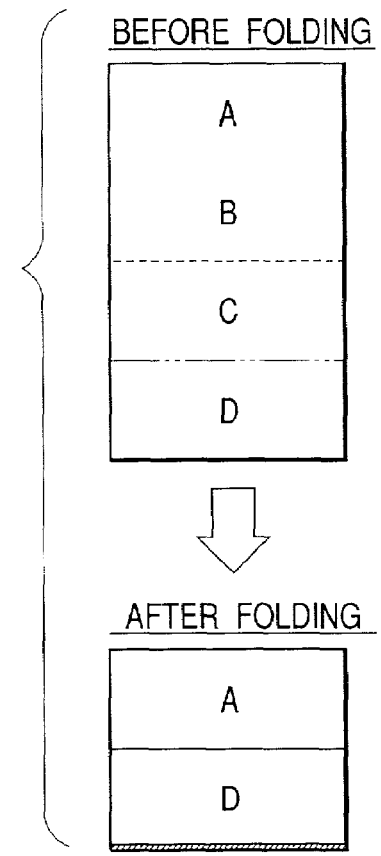

FIGS. 3A and 3B views showing examples of Z-fold.

FIG. 3A shows a case where a paper direction is landscape and left end binding is effected, and FIG. 3B shows a case where a paper direction is portrait and upper end binding is effected. For example, in case of the landscape, by performing fold-up at the middle (between areas B and C) of the paper and fold-down at the middle (between areas C and D) of the right half of the paper, the areas B, C are concealed and only areas A, D are appeared as a front surface. By effecting the Z-fold, the original paper size of A4 is folded into A3 size, and 11×17 size paper is folded into LETTER size. Incidentally, depending upon the binding direction of the paper, since the folding positions are changed, the sheet shape after folding is also changed.

In this system, when mixture of different size papers is handled, Z-fold is effected or not effected in accordance with the paper size. For example, in the printing regarding the mixture of A4 and A3 sizes, the Z-fold is effected only regarding the A4 size paper (referred to as "Z-fold paper" hereinafter) and the fold is not effected regarding the A3 size paper (referred to as "non-Z-fold paper" hereinafter).

Figure 4B:
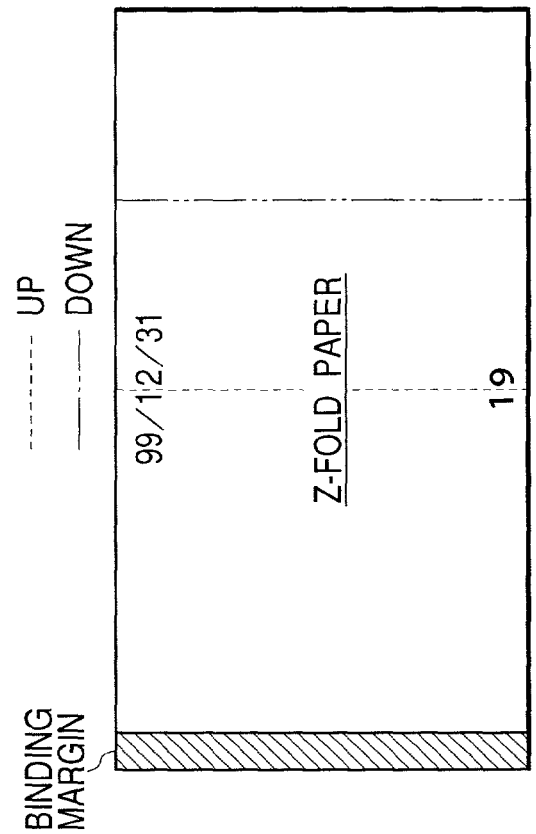
FIGS. 4A, 4B and 4C are views showing a conventional aspect of header/footer print without considering Z-fold function.
Figure 4A:
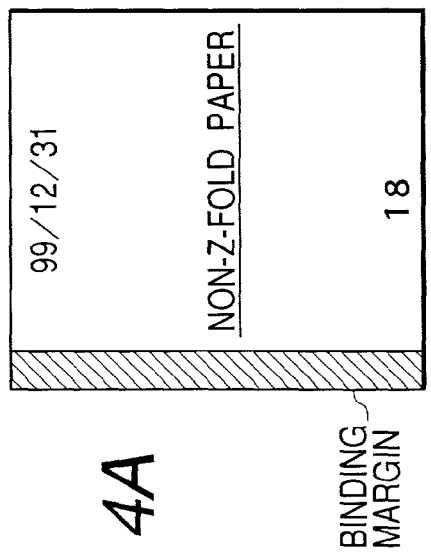
Figure 4C:
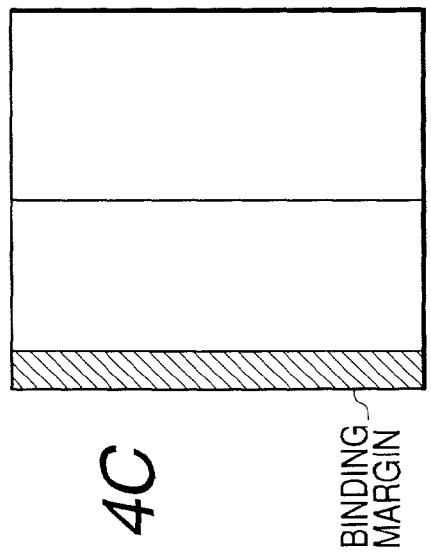

FIGS. 4A to 4C are views showing a conventional aspect of header/footer print without considering Z-fold function, in a case where the paper direction is portrait and the left end binding is effected. FIG. 4A shows a non-Z-fold paper, FIG. 4B shows a Z-fold paper before Z-folding, and FIG. 4C shows a Z-fold paper after Z-folding.

In the past, when header (for example, date "99/12/31") and footer (for example, page numbers "18", "19" and the like) are printed, the printing was effected regardless of the kinds of papers. Accordingly, both in case of the non-Z-fold paper and the Z-fold paper, as shown in FIGS. 4A and 4B, the header and the footer are printed substantially on centers of the papers in a left-and-right direction. Thus, after the Z-fold paper is folded, as shown in FIG. 4C, the header and the footer are concealed not to be seen, with the result that the header and the footer cannot be recognized at a glance. Particularly when the Z-fold papers are bound by means such as stapling, the problem is worsened.

In the illustrated embodiment, print positions of the header and the footer are adjusted so that the header and the footer can be recognized visually even when the papers are bound by means such as stapling. Now, a print position adjusting method according to the illustrated embodiment will be explained.

[Print Controlling Sequence]

Figure 5:
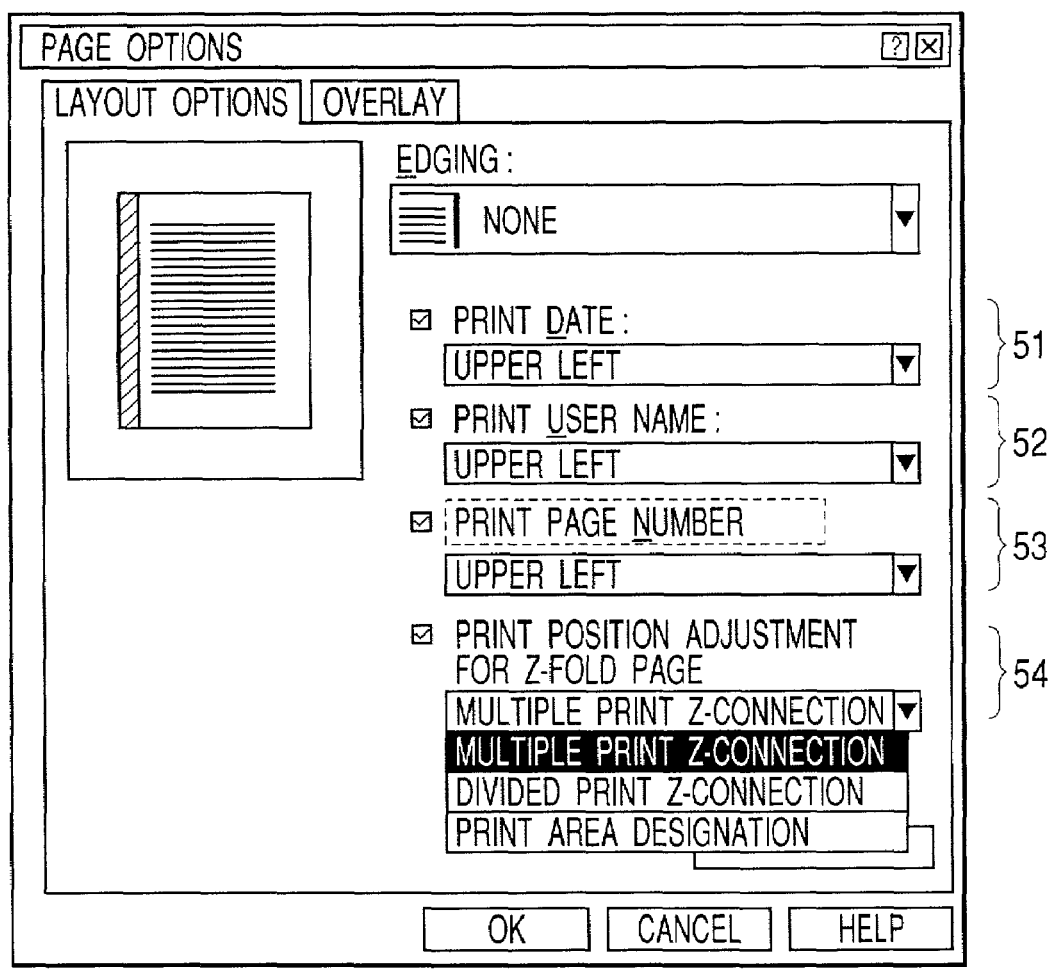
FIG. 5 is a view showing an example of a user interface for adjustment of a header/footer information print position.

FIG. 5 shows an example of a user interface for adjustment of the print positions of the header/footer information according to the illustrated embodiment. The user interface is displayed on the CRT 10. When the print position processing for the header/footer information (which will be described later) is effected, the user of the system must designate specification of the Z-fold function, kind of information (date, document former's name, page number and the like) to be printed as header/footer information (predetermined additional information), and print positions (right side setting, centering, left side setting) of the header/footer information.

In the user interface shown in FIG. 5, the designation of the specification of the Z-fold function can be performed by drop down list in a selection portion ("Print Position Adjustment For Z-fold Page") 54. The designation of the kind of information (date, document former's name, page number and the like) to be printed as the header/footer information can be performed in selection portions 51 ("Print Date"), 52 ("Print User Name") and 53 ("Print Page Number"). The designation of the print positions of the header/footer information can be performed by drop down re-control belonging to the selection portions 51, 52, 53.

FIG. 6 is a flow chart showing the print position adjustment processing for the header/footer information effected by the host computer 3000 according to the illustrated embodiment. It is assumed that various setting operations were already performed by using the user interface shown in FIG. 5 before this processing is started.

First of all, it is judged whether the size of the output paper is size to be Z-folded or not (step S501). For example, regarding the document output of the mixture of A4 size and A3 size papers, if the printer 1500 supports the Z-fold of only A3 size papers, it is judged that the A4 size papers are not to be Z-folded and the A3 size papers are to be Z-folded.

As a result of the judgement, if the size of the output paper is a size to be Z-folded, the program goes to a step S502; whereas, if the size of the output paper is not a size to be Z-folded, the program goes to a step S503. In the step S503, the print position adjustment processing for the header/footer information corresponding to the non-Z-fold paper is effected. That is to say, in order to print the header/footer information designated by the user on positions designated by the user, the header/footer information is combined with main data (print information) of the output page, and then, the program goes to a step S504.

On the other hand, in the step S502, the print position adjustment processing for the header/footer information corresponding to the Z-fold paper is effected. That is to say, as will be fully described later, in order to obtain the position of the header/footer information apparently same as the position printed in the step S503 in a condition that the Z-fold was finished, print data obtained by combining the header/footer information with the main data of the output page, and then, the program goes to a step S504.

In the step S504, the print data produced in the step S502 or the step S503 is outputted to the printer 1500.

Here, regarding the print data produced in the step S502, information designating the Z-fold is outputted to the printer 1500.

[Adjustment Processing of Print Position of Header/footer Information for Z-fold Paper]

Figure 7B:
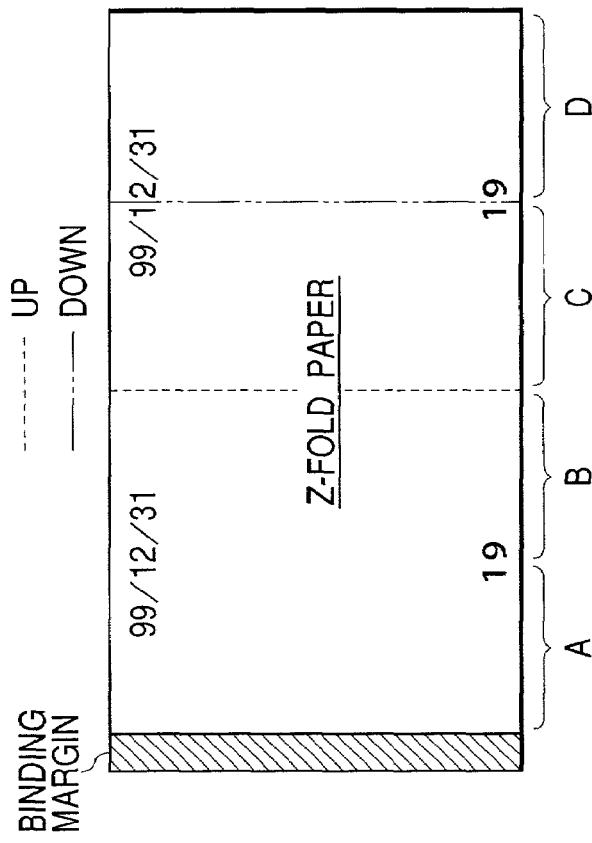
FIGS. 7A, 7B and 7C are views showing an example of adjustment of the header/footer information print position in the first embodiment (positional adjustment of multiple print Z-connection type)
Figure 7A:
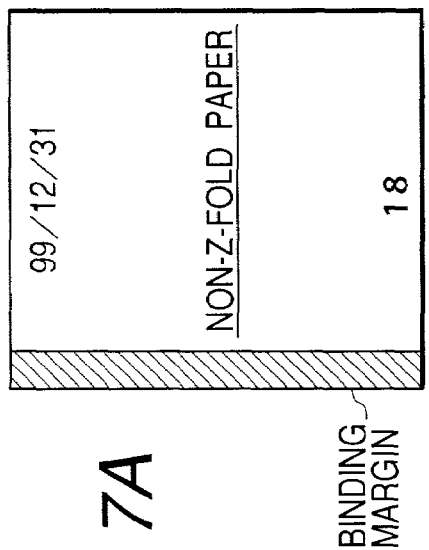
Figure 7C:
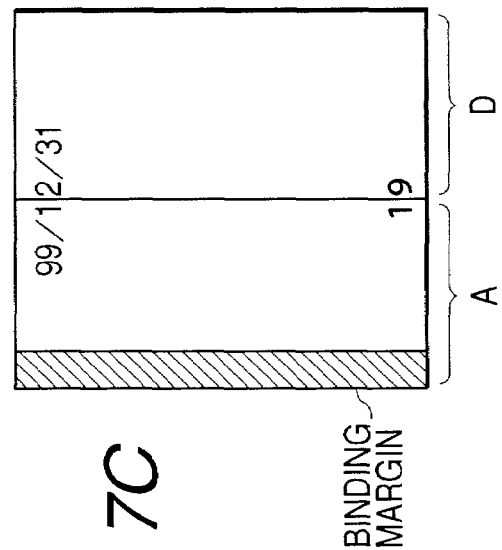

FIGS. 7A to 7C are views showing an example of adjustment of the header/footer information print position in the illustrated embodiment ("Multiple Print Z-connection"), in a case where the paper direction is portrait and the left end binding is effected. FIG. 7A shows a non-Z-fold paper (output result), FIG. 7B shows a Z-fold paper before Z-folding (open condition), and FIG. 7C shows a Z-fold paper after Z-folding (output result). Further, the following description relates to an example that, as the header information, for example, designation for printing date ("99/12/31") at a substantially center in the left-and-right direction is effected, and, as the footer information, the designation for printing the page number (for example, "18", "19" and the like) at the substantially center in the left-and-right direction is effected.

As for the non-Z-fold paper, since the header/footer information is printed as a designated condition, the output result shown in FIG. 7A is the same as that shown in FIG. 4A.

As shown in FIG. 7B, hereinafter, regarding the print area on the front surface of the Z-fold paper, a left half of the left half of the surface is referred to as an area A, a right half of the left half of the surface is referred to as an area B, a left half of the right half of the surface of the Z-fold paper is referred to as an area C, and a right half of the right half of the surface is referred to as an area D. After Z-folded, as shown in FIG. 7C, the areas B, C are concealed, and the areas A, D are not concealed and are adjacent to each other.

In the illustrated embodiment, as shown in FIG. 7B, regarding the Z-fold paper, in the opened condition, two header/footer informations are printed at two positions. Further, the header/footer informations are printed at centers of the left half and the right half of the front surface in the similar manner. Accordingly, the left side header/footer information is printed with straddling between the areas A and B, and the right side header/footer information is printed with straddling between the areas C and D. That is to say, in the step S502 in FIG. 6, when the header/footer information is combined with the document data, the positions of the header/footer informations to be printed are determined so that a component (for example, header "99/1" and footer "1") of the header/footer information printed in the area A and a component (for example, header "2/31" and footer "9") of the header/footer information printed in the area D constitute one header/footer information as "99/12/31" and "19" in a Z-folded condition. As a result, even when the folded page is not opened, the header/footer information can apparently be recognized at a glance, similar to the non-Z-fold paper (FIG. 7A).

Incidentally, the positions of the header/footer informations are adjusted so that each character is not straddling any line dividing the adjacent areas. For example, "99/1" is printed at the left side of the line and "2/31" is printed at the right side of the line. As a result, even if there is print deviation more or less, the characters (information) can easily be recognized after the folding.

According to the illustrated embodiment, regarding the Z-fold paper, when the header/footer information is combined with the document data, two header/footer informations are printed at two positions, and the positions of the header/footer informations are adjusted so that one header/footer information can totally be recognized by the information component printed in the area A and the information component printed in the area D. That is to say, the information component same as that printed in the area B is printed in the area D which conceals the area B after the folding. Accordingly, after the Z-folded, the header/footer information can be recognized at a glance without opening the page, thereby eliminating trouble for opening the folded page. Further, in the Z-folded condition having the same size as the non-Z-fold paper, since the header/footer information is apparently printed at the same position as the non-Z-fold paper, the effect of the present invention is excellent particularly in case of mixed output in which the Z-fold papers and the non-Z-fold papers are bound together by stapling and the like.

Second Embodiment

In a second embodiment of the present invention, a fundamental construction is substantially the same as the first embodiment, as shown in FIGS. 1 and 2. Further, although the adjustment processing of the print position of the header/footer information is the same as that in the first embodiment (FIG. 6), since adjustment processing of the print position of the header/footer information for the Z-paper executed in the step S502 shown in FIG. 6 is different from that in the first embodiment, such difference will be mainly described.

Figure 8B:
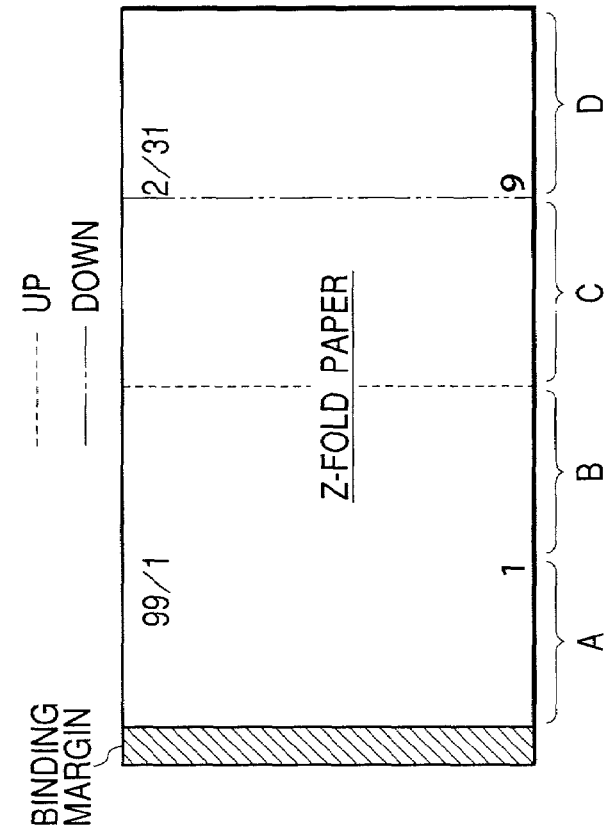
FIGS. 8A, 8B and 8C are views showing an example of adjustment of a header/footer information print position in a second embodiment of the present invention (positional adjustment of divided print Z-connection type)
Figure 8A:
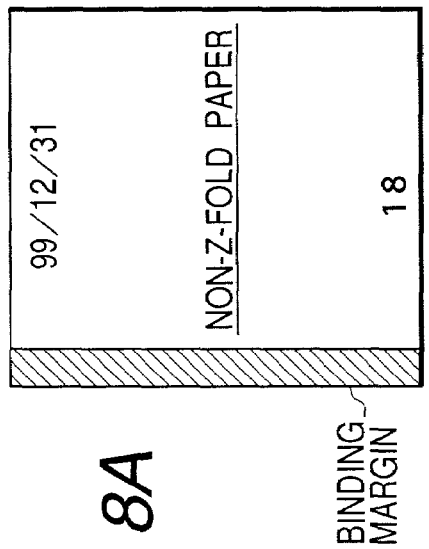
Figure 8C:
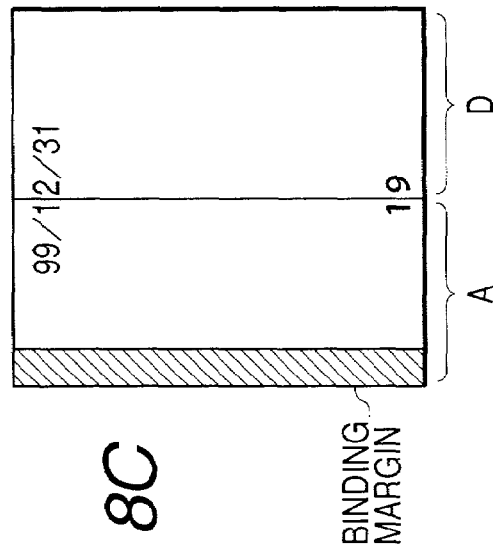

FIGS. 8A to 8C are views showing an example of adjustment processing of a header/footer information print position in the second embodiment ("Divided Print Z-connection"). In this case, it is assumed that designation of the paper direction, binding position, kind of header/footer information and print position is the same as the first embodiment (FIGS. 7A to 7C).

Regarding the non-Z-fold paper, since the header/footer information is printed as a designated condition, the output result shown in FIG. 8A is the same as that shown in FIG. 7A.

As for the Z-fold paper, in the opened condition, the header/footer information is divided into two information components which are in turn printed on the paper. That is to say, when the header/footer information is combined with the document data in the step S502 of FIG. 6, a left half component of the header/footer information (for example, header "99/1" and footer "1") is printed in the area A and a right half component (for example, header "2/31" and footer "9") of the header/footer information is printed in the area D. The positions of the information components of the header/footer information are adjusted so that, when the paper is Z-folded, one header/footer information as "99/12/31" and "19" can be recognized on the basis of the information components printed in the areas A and D. The header/footer information is not printed in the areas B and C.

As a result, similar to the non-Z-fold paper, the header/footer information can apparently be recognized at a glance without opening the folded page. Incidentally, by adjusting the position of the header/footer information so that each of the characters included in the header/footer information is not separated into pieces by the line dividing the areas of the paper, even if there is print deviation more or less, the characters (information) can easily be recognized after the folding.

According to the second embodiment, the effect similar to the first embodiment can be achieved.

Third Embodiment

In a third embodiment of the present invention, a fundamental construction is substantially the same as the first embodiment, as shown in FIGS. 1 and 2. Further, although the adjustment processing of the print position of the header/footer information is the same as that in the first embodiment (FIG. 6), since adjustment processing of the print position of the header/footer information for the Z-paper executed in the step S502 shown in FIG. 6 is different from that in the first embodiment, such difference will be mainly described.

Figure 9A:
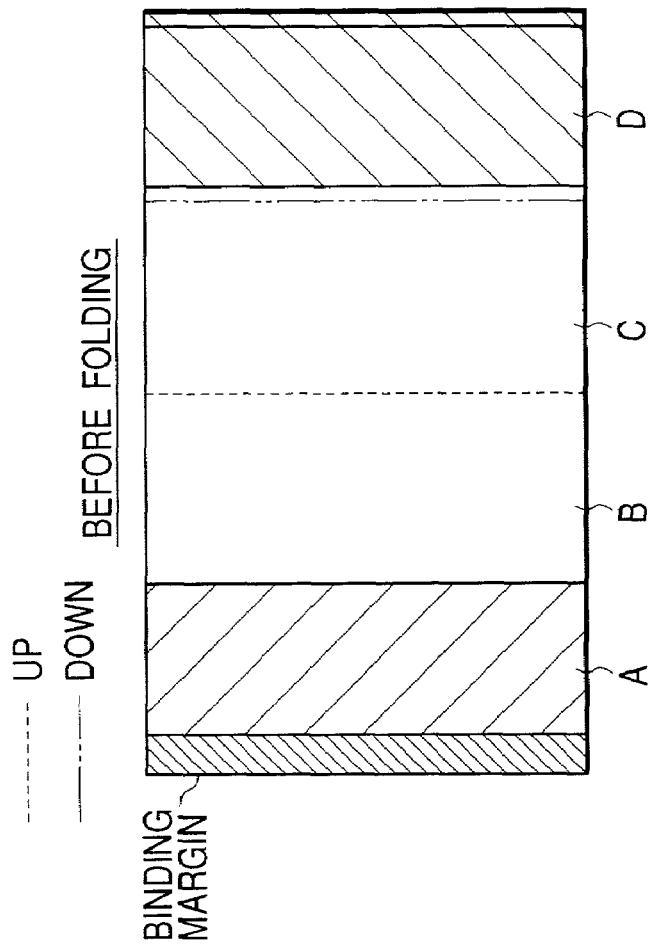
FIGS. 9A and 9B are views for explaining a print designation enable area for header/footer information in a third embodiment of the present invention.
Figure 9B:
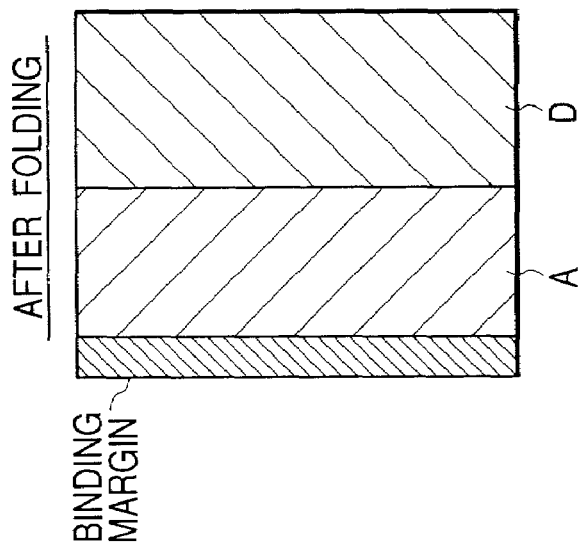

FIGS. 9A and 9B are views for explaining a print designation enable area for header/footer information in the third embodiment, in a case where the paper direction is portrait and the left end binding is effected. FIG. 9A shows a Z-fold paper before Z-folding (opened condition) and FIG. 9B shows the Z-fold paper after Z-folding (output result). Similar to FIGS. 7A to 7C, the front surface of the Z-fold paper is divided into areas A, B, C and D. Incidentally, since the areas B and C are concealed after the Z-folding, these areas are also referred to as non-visible areas, and, since the areas A and D are not concealed before and after the Z-folding, these areas are also referred to as visible areas.

In the third embodiment, the header/footer information is not divided into components but is printed in either of the visible areas. Accordingly, the header/footer information is printed in the area A or the area D. Further, although the print position is designated by the user, it may be designated by default. The designation can be effected as left side setting, centering or right side setting.

Figure 10A:
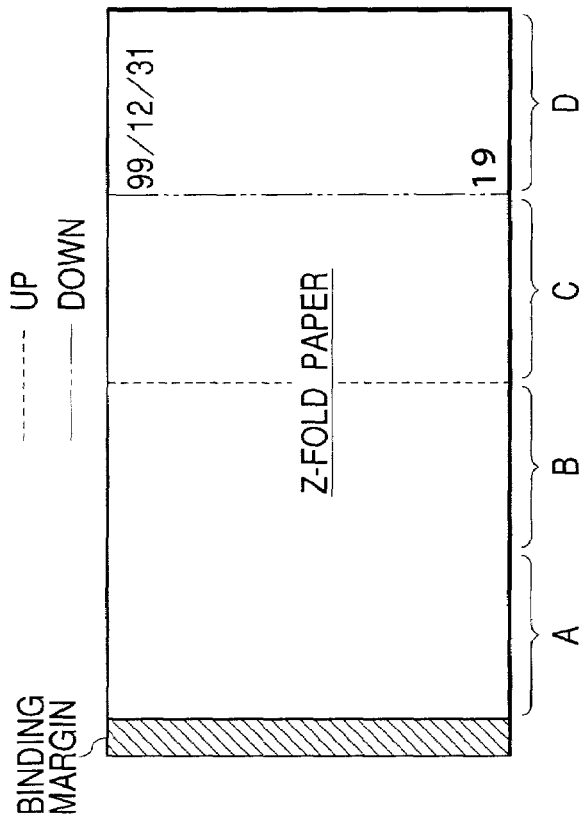
FIGS. 10A, 10B and 10C are views showing an example of adjustment of the header/footer information print position in the third embodiment (positional adjustment of print area designation type)
Figure 10B:
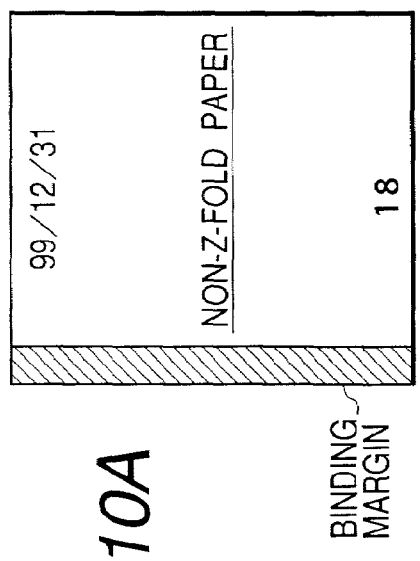
Figure 10C:
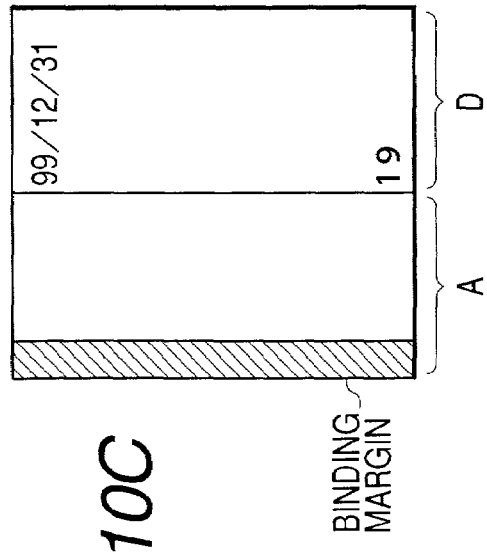

FIGS. 10A to 10C and FIGS. 11A to 11C views showing examples of adjustment of the header/footer information print position in the third embodiment ("Print Area Designation"). The designation of the paper direction, binding position, kind of header/footer information and print position is the same as the first embodiment (FIGS. 7A to 7C). FIGS. 10A to 10C show a case where the print position of the Z-fold paper is designated as right side setting, and 11A to 11C show a case where the print position of the Z-fold paper is designated as left side setting.

Figure 11B:
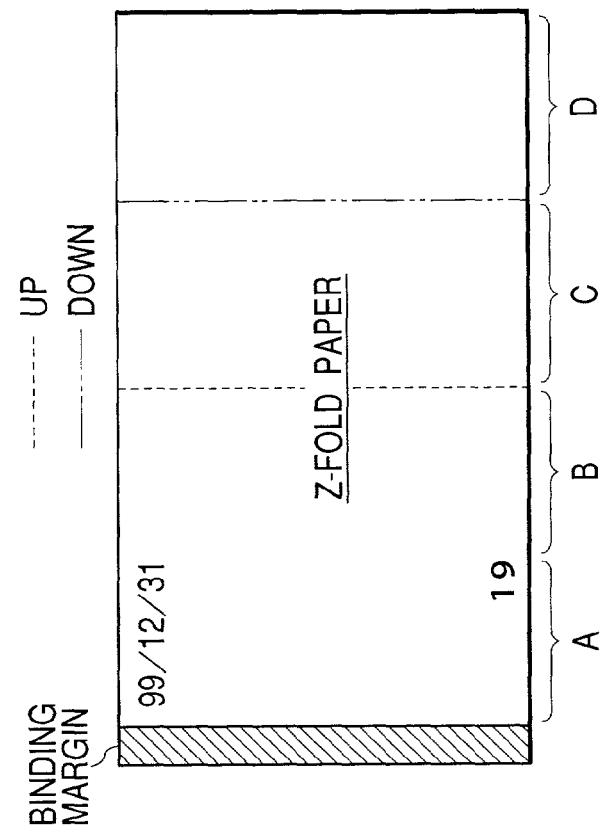
FIGS. 11A, 11B and 11C are views showing an example of adjustment of the header/footer information print position in the third embodiment (positional adjustment of print area designation type)
Figure 11A:
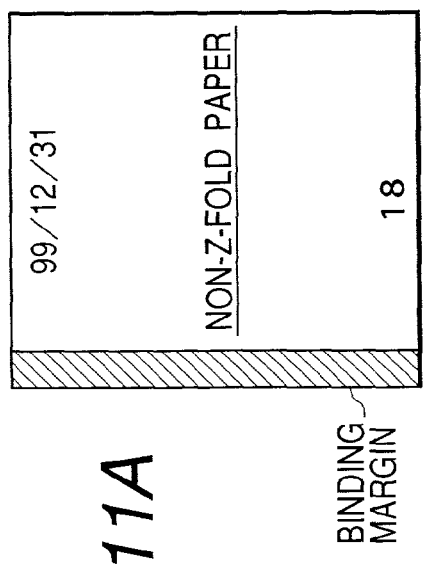
Figure 11C:
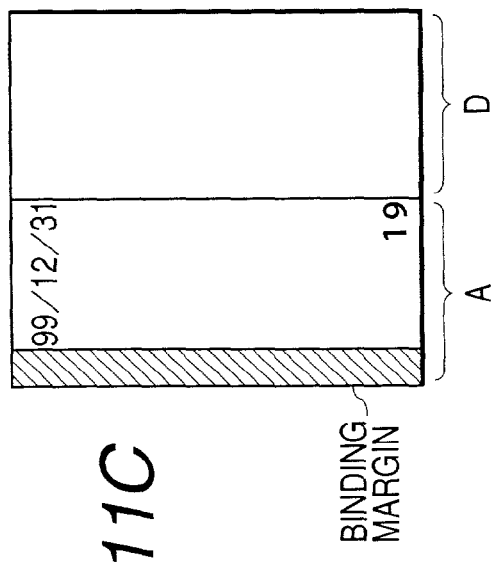

That is to say, when the header/footer information is combined with the document data in the step S502 of FIG. 6, the following processing is effected. First of all, when the right side setting is designated, as shown in FIG. 10B, all of the components of the header/footer information are printed in the area D. On the other hand, when the left side setting is designated, as shown in FIG. 11B, all of the components of the header/footer information are printed in the area A. As a result, the header/footer information can be recognized at a glance before and after the Z-folding (FIGS. 10C and 11C).

Incidentally, in this case, if the entire header/footer information cannot be contained without the area A or D of the Z-fold paper with font size as it is, the font size is reduced to include the information within the area A or D.

Incidentally, if the print position is designated as the centering, the header/footer information is printed in either the area A or the area D. In this case, it is preferable that, when the header/footer information is printed in the area A, the right side setting is designated, and, when the header/footer information is printed in the area D, the left side setting is designated, because the printed information is located nearer to the center.

According to the third embodiment, since all of the components of the header/footer information are printed in the visible area, the same effect as the first embodiment can be achieved, regarding the fact that the header/footer information can be recognized at a glance without opening the Z-folded page.

Incidentally, in the illustrated embodiment, the header/footer informations may be printed in both the area A and the area D.

Fourth Embodiment

In a fourth embodiment of the present invention, a fundamental construction is substantially the same as the first embodiment, as shown in FIGS. 1 and 2. Further, the adjustment processing of the print position of the header/footer information is also the same as that in the first embodiment (FIG. 6).

In this embodiment, both-side printing is effected. Regarding a front surface of the Z-fold paper, the header/footer informations are printed in the same manner as the first embodiment, and header/footer information is also printed in a reverse side of the paper.

Figure 12A:
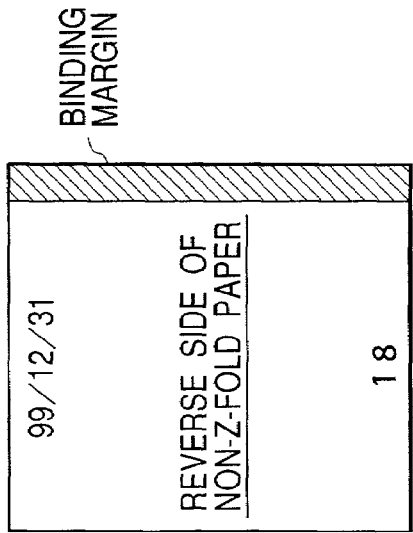
FIGS. 12A, 12B and 12C are views showing a reverse side of a paper, illustrating an example of adjustment of the header/footer information print position in a fourth embodiment of the present invention.
Figure 12B:
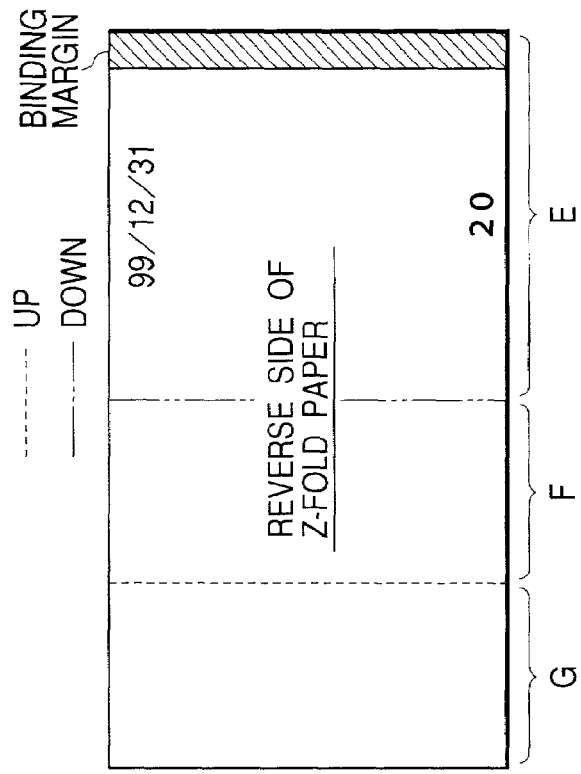
Figure 12C:
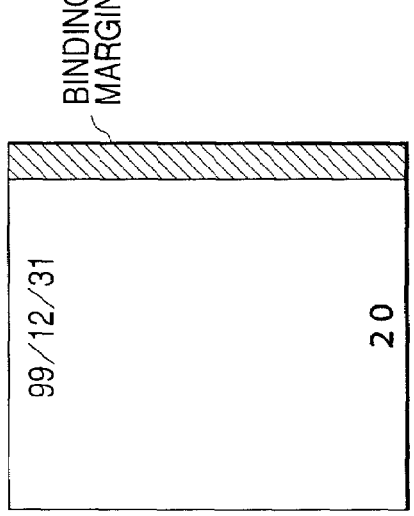

FIGS. 12A to 12C show the reverse side of the paper, illustrating an example of the adjustment of the print position of the header/footer information according to this embodiment. In this example, it is assumed that designation of the paper direction, binding position (left end binding), kind of header/footer information and print position is the same as the first embodiment (FIGS. 7A to 7C).

FIG. 12A shows a non-Z-fold paper (output result), FIG. 12B shows a Z-fold paper before Z-folding (opened condition), and FIG. 12C shows the Z-fold paper after Z-folding (output result). As shown in FIG. 12B, an area E corresponds to the reverse side of the areas A, B and is an area (reverse side visible area) which can be seen before and after the Z-folding. Areas F and G correspond to the areas C and D, respectively and are concealed after the Z-folding.

In this embodiment, all of the components of the header/footer information are printed in the area E. In this case, the print position is designated by the user. The print position can be designated as left side setting, centering or right side setting. In FIG. 12B, an example that the centering is designated is shown. If the left side setting is designated, the information is printed in the area E with left side setting, and, if the right side setting is designated, the information is printed in the area E with right side setting. As a result, apparent appearance can be made same as the header/footer information printed on the non-Z-fold paper.

According to this embodiment, not only the effect same as the first embodiment can be achieved, but also, even when the Z-fold paper is looked at from the reverse side, the header/footer information can be recognized at a glance without opening the Z-folded page, thereby further eliminating the trouble.

Incidentally, in this embodiment, the printing of the header/footer information on the front surface of the paper can be performed in the same manner as that in the second or third embodiment.

Further, in this embodiment, the header/footer information may not be printed on the front surface, and the header/footer information may be printed only on the reverse side in accordance with the manner of this embodiment.

Incidentally, the present invention may be applied to a system constituted by a plurality of equipments (for example, host computer, interface equipments, reader and printer). Further, the present invention may be applied to a device (for example, copying machine, printer or facsimile) comprising a single equipment.

In the above-mentioned embodiments, while an example that the header/footer information is printed was explained, the present invention can be applied to print adjustment of any information which can be added to the document data.

Further, it should be noted that the object of the present invention can be achieved by supplying a recording medium storing a program code of software for executing the functions of the above-mentioned embodiments to the print controlling apparatus or the system and by reading out and executing the program code stored in the recording medium by means of a computer (or CPU or MPU) of the print controlling apparatus and the like.

In this case, the program code itself read out from the recording medium realizes new function of the present invention, and, thus, the recording medium storing such program code constitutes the present invention. Further, when the program code is supplied through an electrical medium, the program code itself constitutes the present invention.

As the recording medium for supplying the program code, for example, a floppy disk, a hard disk, an optical disk, a photo-magnetic disk, CD-ROM, CD-R, a magnetic tape, a non-volatile memory card or ROM can be used.

Further, it should be noted that not only the present invention includes a concept that the functions of the above-mentioned embodiments are realized by executing the read out program code read by means of the computer, but also OS running on the computer executes the actual processing partially or totally on the basis of instruction of the program code to realize the functions of the embodiments.

Further, it should be noted that the present invention includes a concept that, after the program code read out from the recording medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

As mentioned above, according to the present invention, the predetermined additional information can be recognized at a glance without opening the folded page.

Further, by printing the predetermined additional information so that the predetermined additional information recognized from the paper which was folded into the predetermined form can be recognized apparently in the same manner as the predetermined additional information printed on other paper having a substantially the same size as the size of the folded paper, even if the folded paper is mixed with a non-fold paper, the predetermined additional information can be recognized at a glance in the apparently similar manner.

What is claimed is:

1. A print controlling apparatus that controls a printing device, wherein the printing device outputs as one document a mixture of a first print paper that is not to be folded and a second print paper that is to be folded into a predetermined form, and wherein the first print paper and the second print paper are different in size from each other, said print controlling apparatus comprising:
input means for inputting information representing a presence/absence of a fold designation by an operator;
producing means for producing print data by adding additional information to information to be printed; and
control means for controlling a print position of the additional information on a print image corresponding to the print data produced by said producing means, based on the presence/absence of the fold designation inputted by said input means,
wherein said control means controls the print position to be different for the first print paper in comparison with the second print paper, such that the additional information on the second print paper, which is folded, is recognizable at a glance without opening the folded second print paper, as is the additional information on the first print paper, which is not folded.

2. A print controlling apparatus according to claim 1, wherein the predetermined form is Z-fold.

3. A print controlling apparatus according to claim 1, wherein the additional information is either header information or footor information.

4. A print controlling apparatus according to claim 1, wherein the additional information is either date information or page information.

5. A print controlling apparatus according to claim 1, wherein said control means controls the print position of the additional information on the print image in such a manner that the additional information is visually recognizable in a condition that a sheet of paper is not folded, when the fold designation is present indicating that paper is to be folded.

6. A print controlling apparatus according to claim 1, further comprising position selecting means for selecting a position for the additional information on the print image from among a plurality of predetermined positions by the operator, and wherein said control means controls the print position of the additional information on the print image based on the position selected by said position selecting means.

7. A print controlling method of an apparatus that controls a printing device, wherein the printing device outputs as one document a mixture of a first print paper that is not to be folded and a second print paper that is to be folded into a predetermined form, and wherein the first print paper and the second print paper are different in size from each other, said method comprising:
an input step for inputting information representing a presence/absence of a fold designation by an operator;
a producing step for producing print data by adding additional information to information to be printed; and
a control step for controlling a print position of the additional information on a print image corresponding to the print data produced in said producing step, based on the presence/absence of the fold designation inputted in said input step,
wherein said control step includes controlling the print position to be different for the first print paper in comparison with the second print paper, such that the additional information on the second print paper, which is folded, is recognizable at a glance without opening the folded second print paper, as is the additional information on the first print paper, which is not folded.

8. A print controlling method according to claim 7, wherein the predetermined form is Z-fold.

9. A print controlling method according to claim 7, wherein the additional information is either header information or footor information.

10. A print controlling method according to claim 7, wherein the additional information is either date information or page information.

11. A print controlling method according to claim 7, wherein said control step includes controlling the print position of the additional information on the print image in such a manner that the additional information is visually recognizable in a condition that a sheet paper is not folded, when the fold designation is present indicating that paper is to be folded.

12. A print controlling method according to claim 7, further comprising a position selecting step for selecting a position for the additional information on the print image from among a plurality of predetermined positions by the operator, and wherein said control step includes controlling the print position of the additional information on the print image based on the position selected in said position selecting step.

13. A print controlling program stored in a storage medium and executed by a computer of an information processing apparatus that controls a printing device, wherein the printing device outputs as one document a mixture of a first print paper that is not to be folded and a second print paper that is to be folded into a predetermined form, and wherein the first print paper and the second print paper are different in size from each other, said print controlling program comprising:
code for an input step for inputting information representing a presence/absence of a fold designation by an operator;
code for a producing step for producing print data by adding additional information to information to be printed; and
code for a control step for controlling a print position of the additional information on a print image corresponding to the print data produced in said producing step, based on the presence/absence of the fold designation inputted in said input step,
wherein said control step includes controlling the print position to be different for the first print paper in comparison with the second print paper, such that the additional information on the second print paper, which is folded, is recognizable at a glance without opening the folded second print paper, as is the additional information on the first print paper, which is not folded.

14. A print controlling program according to claim 13, wherein the predetermined form is Z-fold.

15. A print controlling program according to claim 13, wherein the additional information is either header information or footor information.

16. A print controlling program according to claim 13, wherein the additional information is either date information or page information.

17. A print controlling program according to claim 13, wherein said control step includes controlling the print position of the additional information on the print image in such a manner that the additional information is visually recognizable in a condition that a sheet of paper is not folded, when the fold designation is present indicating that paper is to be folded.

18. A print controlling program according to claim 14, further comprising code for a position selecting step for selecting a position of the additional information on the print image from among a plurality of predetermined positions by the operator, and wherein said control step includes controlling the print position of the additional information on the print image based on the position selected in said position selecting step.

19. A print controlling method of an apparatus that controls a printing device, wherein the printing device outputs as one document a mixture of a first print paper that is not to be folded and a second print paper that is to be folded into a predetermined form, wherein the first print paper and the second print paper are different in size from each other, and wherein instructions for a fold designation is sent by a printer driver to the printing device, said method comprising:

an input step for inputting information representing a presence/absence of the fold designation by an operator from a graphical user interface (GUI) of the printer driver;

a producing step for producing print data by adding additional information to information to be printed; and a control step for controlling a print position of the additional information on a print image corresponding to the print data produced in said producing step, based on the presence/absence of the fold designation inputted in said input step, wherein said control step includes controlling the print position to be different for the first print paper in comparison with the second print paper, such that the additional information on the second print paper, which is folded, is recognizable at a glance without opening the folded second print paper, as is the additional information on the first print paper, which is not folded.

20. A print controlling method according to claim 19, wherein the predetermined form is Z-fold.

21. A print controlling method according to claim 19, wherein said control step includes controlling the print position of the additional information on the print image in such a manner that the additional information can be visually recognized in a condition that a sheet paper is not folded, when the fold designation is present indicating that paper is to be folded.

* * * * *

UNITED STATES PATENT AND TRADEMARK OFFICE
CERTIFICATE OF CORRECTION

| | |
|---|---|
| PATENT NO. | : 7,072,070 B2 |
| APPLICATION NO. | : 09/885055 |
| DATED | : July 4, 2006 |
| INVENTOR(S) | : Kazunori Masaki |

It is certified that error appears in the above-identified patent and that said Letters Patent is hereby corrected as shown below:

TITLE PAGE,

[57] ABSTRACT

Line 3, "as" should read --in--.

COLUMN 1

Line 28, "printer" should read --printed--.

COLUMN 2

Line 50, "is" should be deleted.

COLUMN 4

Line 54, "are appeared" should read --appear--.

COLUMN 5

Line 40, "drop down" should read --drop-down--.
    Line 47, "drop down" should read --drop-down--.

COLUMN 6

Line 12, "obtained" should read --is obtained--.

COLUMN 8

Line 46, "views" should read --are views--.
    Line 53, "11A" should read --FIGS. 11A--.

UNITED STATES PATENT AND TRADEMARK OFFICE
CERTIFICATE OF CORRECTION

PATENT NO. : 7,072,070 B2
APPLICATION NO. : 09/885055
DATED : July 4, 2006
INVENTOR(S) : Kazunori Masaki It is certified that error appears in the above-identified patent and that said Letters Patent is hereby corrected as shown below:

COLUMN 13

Line 15, "is" should read --are--.

Signed and Sealed this

Twentieth Day of February, 2007

JON W. DUDAS
*Director of the United States Patent and Trademark Office*